Dec. 12, 1961 J. B. CHATTEN 3,012,887
METHOD OF PRODUCING CONTROLLED DISPLACEMENT OF SCREEN
ELEMENTS IN CATHODE RAY TUBES
Filed Feb. 25, 1957 2 Sheets-Sheet 1

INVENTOR.
JOHN B. CHATTEN
BY
ATTORNEY

Dec. 12, 1961  J. B. CHATTEN  3,012,887
METHOD OF PRODUCING CONTROLLED DISPLACEMENT OF SCREEN
ELEMENTS IN CATHODE RAY TUBES
Filed Feb. 25, 1957  2 Sheets-Sheet 2

INVENTOR.
JOHN B. CHATTEN
BY
ATTORNEY ent Office 3,012,887
Patented Dec. 12, 1961

3,012,887
METHOD OF PRODUCING CONTROLLED DISPLACEMENT OF SCREEN ELEMENTS IN CATHODE RAY TUBES
John B. Chatten, Philadelphia, Pa., assignor to Philco Corporation, Philadelphia, Pa., a corporation of Pennsylvania
Filed Feb. 25, 1957, Ser. No. 641,934
3 Claims. (Cl. 96—43)

This invention relates to the manufacture of cathode ray tubes and more particularly to the production of controlled displacement of screen elements in such tubes. The invention further relates to a method of producing a sub-master for use in the manufacture of cathode ray tubes wherein it is desired to effect controlled displacement of screen elements according to a predetermined pattern.

While not limited thereto, the invention is particularly applicable to the manufacture of color image-producing cathode ray tubes to be used in color television receivers employing a single cathode ray tube. The screen of such a tube has groups of elements thereon emissive of light of different colors, and it also has index elements for producing an indexing signal which is utilized to effect proper coordination between modulation and position of the image-producing beam, such coordination being requisite for proper color rendition. The cathode ray tube screen preferably comprises parallel phosphor stripes arranged in color triplets, each triplet comprising three phosphor stripes which respond to electron impingement to produce light of three primary colors such as red, green and blue. The index elements preferably are in the form of spaced stripes and they are positionally related to said triplets. The number of index elements may be equal to, greater or less than the number of groups of colored light-emissive elements.

In any cathode ray tube employing index elements, the electron impingement on said elements causes a flow of energy from each point of impingement to a common output point from which the indexing signal is derived and is fed to an external circuit. The flow of energy may be secondary electron emission, light emission, conductive flow of electrons, or of any other character. Thus, the index elements may be composed of a material, such as magnesium oxide, to emit secondary electrons to be collected by a collector electrode; or they may be composed of a material, such as zinc oxide, to emit light to be received by photoelectric means; or they may be composed of conductive material and may be connected to a common output lead.

In a copending application of R. G. Clapp, Serial No. 634,217 filed January 15, 1957, there is disclosed and claimed a screen structure wherein the index elements and the groups of colored light-emissive elements are relatively displaced to eliminate or minimize color error. As set forth in the Clapp application, the color error is due to time variation between the electron impingement on the index elements and the performance of the aforementioned coordinating function, and according to the Clapp invention the screen elements are relatively displaced as a function of said time variation over the screen area.

In the preferred method of manufacture of a cathode ray tube of the type here involved, as described in a copending application of M. Sadowsky et al., Serial No. 408,219, filed February 4, 1954, each set of screen elements is formed by first applying to the screen a coating of photosensitive material, then exposing to light the portions of the coating where the elements are to be provided, then applying the material which is to form the elements and finally washing away the unexposed portions of the coating. In such method, the selective exposure of stripe portions to light is accomplished by projecting light through a master having spaced transparent stripes but being otherwise opaque.

With the foregoing in mind, the principal object of the present invention is to provide a method for use in the manufacture of cathode ray tubes wherein it is desired to effect controlled displacement of screen elements, as in a screen structure according to the teaching of the aforementioned Clapp application.

The present invention is applicable wherever it suffices to provide various displacements of screen elements in different zones of the screen area. Thus, with respect to color error in a color image-producing cathode ray tube of the character above-mentioned, it has been found that displacement of the index elements in zones of the screen area, generally in accordance with the color error pattern, is effective to reduce color error to the point where it is negligible. While the same result could be achieved by displacing the colored light-emissive elements relative to the index elements, it is usually simpler to displace the index elements.

In accordance with the preferred form of this invention, a sub-master is produced by successively exposing different zones or areas of a photographic plate to light through a master in such a manner as to effect zone-by-zone displacement of the master image on said plate. Then the plate is developed and it becomes a sub-master having the desired pattern of displacement, and it may be used to expose to light those portions of the cathode ray tube screen where the displaced elements are to be formed.

In producing the sub-master, the preferred procedure is to first make a map of the screen area zoned according to the different degrees of displacement desired in the various zones. Thus, where the objective is to eliminate or minimize color error in a color image-producing cathode ray tube, the map is zoned according to the degrees of color error. Then zone plates or masks are made according to the zoning of the map, and the zone masks are used in conjunction with the aforementioned master in making the desired sub-master.

An alternative procedure according to this invention is to utilize the masks in association with a master directly to effect selective light exposure of the cathode ray tube screen. However, this procedure is less desirable than that involving the production of a sub-master, as will be appreciated later.

The invention may be fully understood from the following detailed description with reference ot the accompanying drawings, wherein FIG. 1 illustrates, by way of example, a pattern of displacement of index elements in a cathode ray tube;

It will be understood that the displacement of the screen elements is with reference to a normal position representing zero displacement. In color television receivers in which the color-representative signal successively represents the primary colors red, green and blue, the previously mentioned color triplets of the cathode ray tube each may comprise three phosphor stripes emissive of light of the said colors in the order mentioned. Suppose that there is one index stripe for each color triplet and that the normal position of the index stripes is directly behind the red light-emissive stripes. Then if the space or distance between consecutive red light-emissive stripes is regarded as 360 electrical degrees, and if each red light-emissive stripe is regarded as positionally representing zero displacement, each green light-emissive stripe may positionally represent 120° displacement, and each blue light-emissive stripe may positionally represent 240° displacement. Thus if an index stripe were displaced 120°, it would be shifted from its normal position to a position directly behind the green light-emissive stripe.

Figure 1:
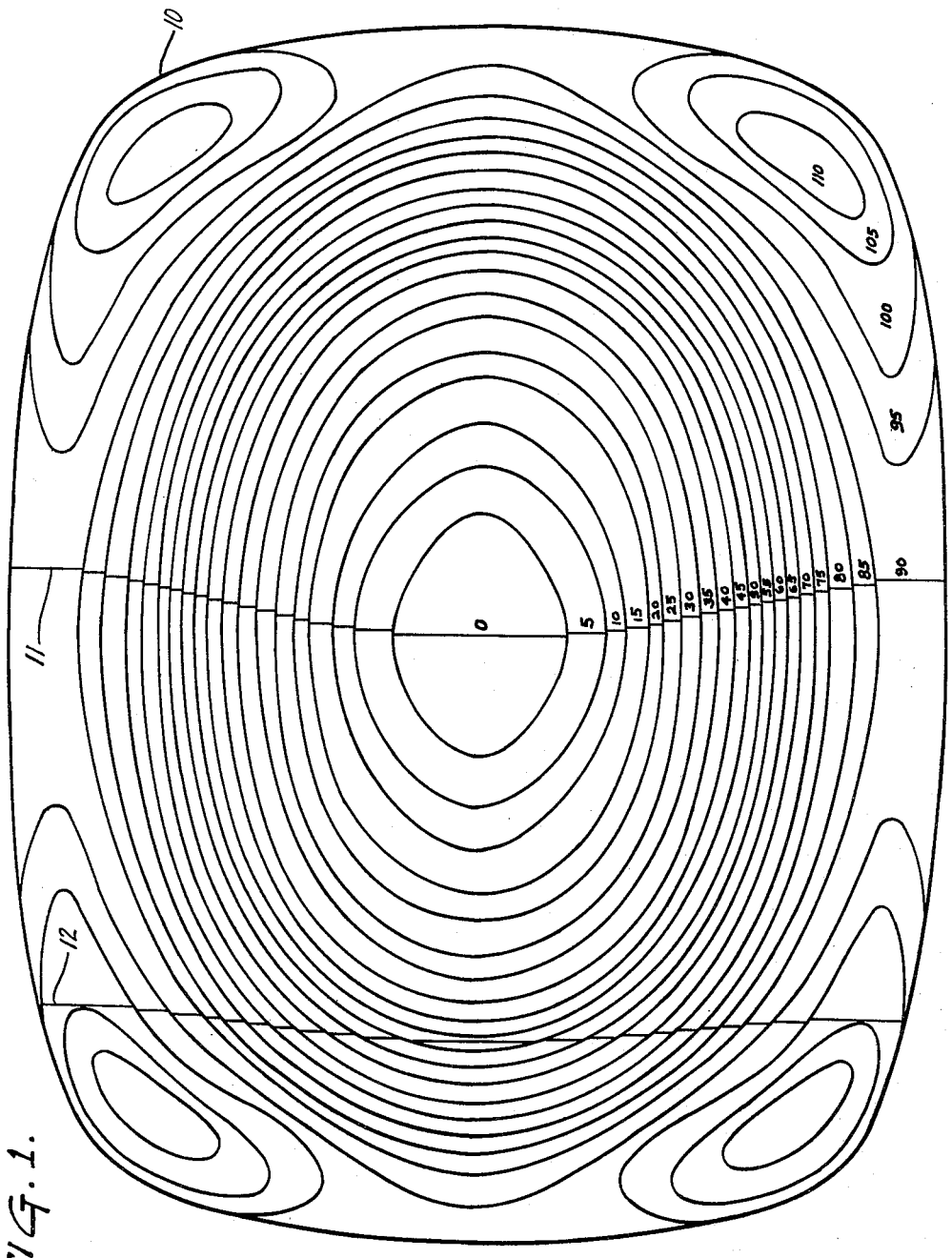

Referring first to FIG. 1, there is illustrated a pattern of displacement of the index stripes which has been found to be suitable to compensate for varying transit time of secondary electrons in a cathode ray tube employing index elements emissive of secondary electrons. In this illustration, the area of the cathode ray tube screen which is visible to a viewer is represented as defined by the border line 10. The screen area is represented as it is seen by a viewer. In accordance with this invention, the screen area is divided into zones wherein the displacement of the index stripes to the right increases zone-by-zone in 5° increments. Thus within the central zone, the index stripes have zero displacement; within the immediately adjacent zone, the index stripes have 5° displacement; within the next zone the index stripes have 10° displacement; and so on.

It will be realized that it is impossible to illustrate to scale the actual displacements which are very small. By way of example, two of the index stripes are shown at 11 and 12 with the displacement greatly exaggerated so as to be clearly visible. Since the index stripe 11 extends through the central zone, it has zero displacement within that zone, but in the other zones through which it extends, it is displaced to the right the number of degrees represented by each zone. Since the index stripe 12 does not extend through the central zone, it is displaced to the right in all of the zones through which it extends, the displacement in each zone being the number of degrees represented by that zone. In the preferred practice of this invention, a map of the screen area is first made, with contour lines thereon as in FIG. 1, dividing the area into zones according to the desired pattern of displacement of the index stripes. Then zone masks are made according to the zone pattern of the map, and these masks are used in conjunction with a striped master to produce the desired pattern of placement of the index stripes. The zone masks and the striped master are preferably made by exposing selected portions of photographic plates to light and then developing the plates.

Figure 2:
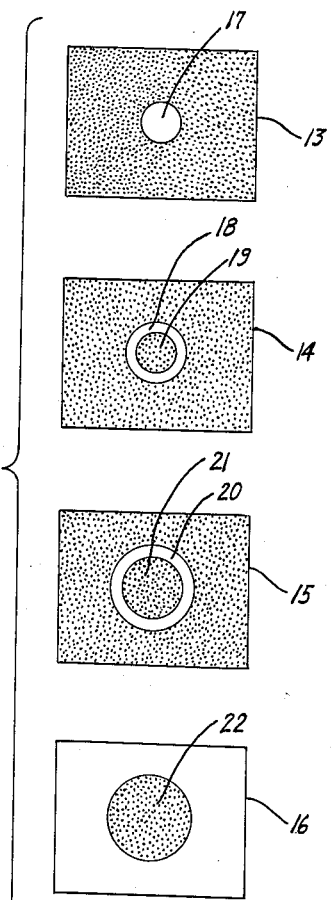
FIG. 2 shows a set of zone masks which may be employed according to the present invention.

The method according to one embodiment of this invention may be clearly understood by considering it with reference to a simple pattern. Suppose, for example, that the screen area is divided into four simple zones—a central zone, two concentric annular zones, and an outer zone. According to one embodiment of this invention, four zone masks are made as shown in FIG. 2 at 13, 14, 15 and 16. Mask 13 has a central transparent area 17, and it is opaque throughout the rest of its area. Mask 14 has a transparent annular area 18, and it is opaque throughout its other portions. It should be noted that the opaque area 19, within the transparent area 18, is of the same size and shape as the transparent area 17 of mask 13. Mask 15 has a transparent annular area 20, and it is opaque throughout its other portions. It should be noted that the opaque area 21 is equal to the combined areas 18 and 19 of mask 14. Mask 16 has an opaque area 22, which is equal to the combined areas 20 and 21 of mask 15, and it is transparent throughout the remainder of its area.

Figure 3:
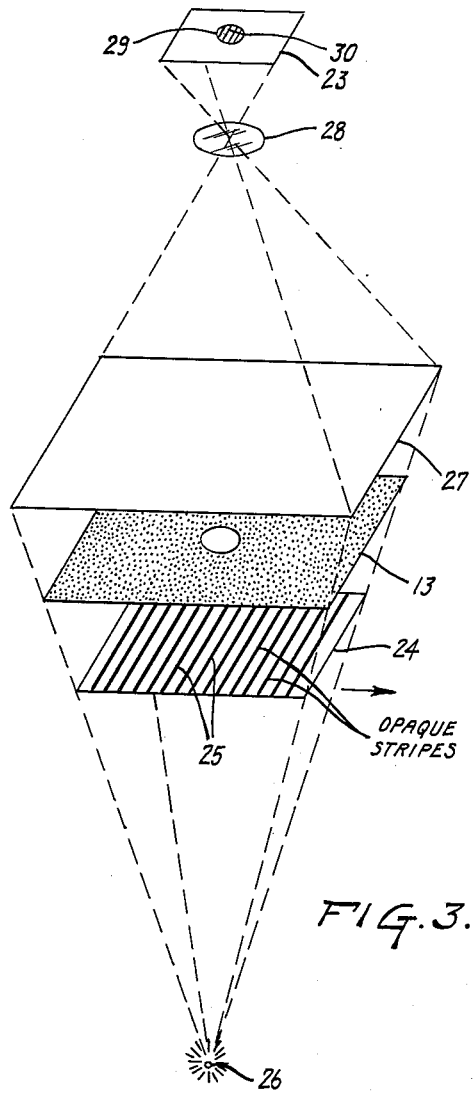
FIG. 3 is a perspective view showing how the displacement pattern is produced.

The manner in which these zone masks are used to produce the desired pattern of displacement of the index stripes is simply illustrated in FIG. 3. In the preferred practice of the invention, a photographic plate 23 is subjected to successive exposures by employing the zone masks successively in conjunction with a striped mask or master 24. The latter has opaque stripes 25 and is otherwise transparent. The spacing of the opaque stripes 25 corresponds to the desired spacing of the index stripes on the screen of the cathode ray tube.

Light from a point source 26 passes through the master 24 and through one of the zone masks, and produces an image on a ground glass plate 27. This image is projected through a lens 28 onto the photographic plate 23. The projected image is displaced for each exposure of the photographic plate, preferably by displacement of the master 24, although this could be accomplished in other ways, as by displacing the photographic plate or the lens or the light source.

Considering the sequence of operations involving the masks of FIG. 2, the master 24 is initially in a position corresponding to zero displacement of the index stripes. The mask 13 is first placed between master 24 and the ground glass plate 27. Then the point source of light 26 is turned on. It will be seen that the central area 29 of photographic plate 23 will be exposed except for stripes 30 which will remain unexposed.

The zone mask 13 is removed, after turning off the light source 26, and the next zone mask 14 is inserted. The master 24 preferably is moved slightly to the right to a distance corresponding to the index displacement desired in the zone defined by the transparent area 18 of mask 14. The light source 26 is then turned on, exposing the next area of plate 23 except for stripes slightly offset in relation to the stripes 30.

The same procedure is followed with the zone masks 15 and 16, with the master 24 slightly displaced further to the right in each instance to effect the desired index displacement.

It will be realized, of course, that FIG. 3 is intended to illustrate clearly the method involved and is not intended to represent the actual dispositions of the elements. In practice, the process may be carried out by means of a projector having provision for location of the photographic plate, the zone masks and the master, and also for displacement of the master.

Figure 4:
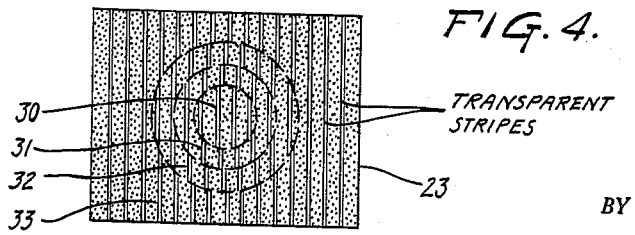
FIG. 4 is a face view of a sub-master produced according to the preferred form of this invention.

As a result of this process, the photographic plate 23, after development, has transparent stripes as shown in FIG. 4 and is otherwise opaque. At its central portion, the plate 23 has the transparent stripes 30 which have zero displacement. The next zone of the plate 23 has transparent stripes 31 which are slightly displaced to the right. The next zone of the plate 23 has transparent stripes 32 which are further slightly displaced to the right. The outermost zone of the plate 23 has transparent stripes 33 which are still further slightly displaced to the right.

As previously mentioned, the preferred method of manufacture of a cathode ray tube of the type here involved is that described in the aforementioned Sadowsky et al. application. The index stripes may be provided on the screen of the cathode ray tube according to said method, using the plate or sub-master 23 to expose to light stripe portions of the screen corresponding to the stripes 30 to 33 in FIG. 4. Thus the index stripes are provided on the screen according to the pattern of the transparent stripes of sub-master 23.

While in practice the pattern of displacement of the index stripes, such as shown in FIG. 1, involves a much greater number of zones than the simple displacement pattern of FIG. 4, it will be understood that the production of a sub-master having the displacement pattern of FIG. 1 simply requires a greater number of zone masks and a greater number of successive exposures of the photographic plate which is to constitute the sub-master.

It will be understood, of course, that this invention is applicable in any case where it is desired to effect displacement of screen elements in any zone or zones of a cathode ray tube screen. Thus the invention is not limited to a pattern of the type illustrated but is applicable to any pattern.

As above described, in the preferred practice of this invention the displacement pattern of the screen elements is produced on a sub-master which is then used to produce the same pattern on the screen of a cathode ray tube. Once the sub-master is produced, it can be used to produce the pattern on screens of successive cathode ray tubes.

It will be apparent, however, that the displacement pattern could be produced directly on the screen of a cathode ray tube by this method. Thus in FIG. 3, instead of successive exposure of the plate 23, a photosensitive coating on the screen of a cathode ray tube could be exposed zone-by-zone, utilizing a striped master having transparent stripe portions so as to expose stripe portions of the screen. However, this procedure would be time-consuming and expensive because each cathode ray tube would require the multiple exposure process.

While the invention has been described with reference to specific forms and applications, it is to be understood that the invention is not limited thereto but contemplates such modifications and other applications as may be resorted to by those skilled in the art.

I claim:

1. In the manufacture of color image-reproducing cathode ray tubes having colored light-emissive elements and index elements on the screen thereof, wherein an index signal is produced by flow of energy from successively scanned points of the screen area to a common output point, and wherein for proper color rendition it is desired that said light-emissive elements and said index elements shall have different predetermined relative positions in predetermined successive zones of the screen area, a method of establishing desired different positioning of elements in said zones which comprises producing masks for said zones to be used successively in the order of succession of said zones, each mask having a single transparent area corresponding precisely to the zone represented by the mask and being otherwise opaque, arranging a photosensitive surface for exposure from a light source, interposing said masks in said order of succession between said surface and said light source to define for exposure successive zones of said surface corresponding respectively to the successive zones of the screen area, and at the same time interposing between said surface and said light source a member having opaque and transparent portions defining a pattern of the screen elements to be positioned in said zones, thereby to project through said masks onto the successively defined zones of said surface images of the screen elements, the projected image being displaced for each exposure according to the desired different positioning of said elements in the successive zones of the screen area, and finally developing said surface to fix the images thereon.

2. In the manufacture of color image-reproducing cathode ray tubes having colored light-emissive stripes and index stripes on the screen thereof, wherein an index signal is produced by flow of energy from successively scanned points of the screen area to a common output point, and wherein for proper color rendition it is desired that said index stripes shall have different predetermined positions in relation to said light-emissive stripes in predetermined successive zones of the screen area, a method of preparing a photographic plate having transparent stripes according to the desired pattern of the index stripes over the screen area, which comprises making a map of the screen area with lines on the map dividing it into the said successive zones, producing according to said map masks for said zones to be used successively in the order of succession of said zones, each mask having a single transparent area corresponding precisely to the zone represented by the mask and being otherwise opaque, arranging a photographic plate for exposure from a light source, interposing said masks in said order of succession between said plate and said light source to define for exposure successive zones of said plate corresponding respectively to the successive mapped zones of the screen area, and at the same time interposing between said plate and said light source a member having opaque stripes corresponding to said index stripes and being otherwise transparent, thereby to project through said masks onto the successively defined zones of said plate images of the index stripes, the projected image being displaced for each exposure according to the desired different positioning of the index stripes in the successive zones of the screen area, and finally developing said plate so that it has transparent stripes according to the desired pattern of the index stripes over the screen area.

3. A method according to claim 2, wherein the successive zones include a central zone and surrounding zones, and said masks serve to define first the central zone and then the surrounding zones in succession.

References Cited in the file of this patent

UNITED STATES PATENTS

| 1,853,072 | Morioka | Apr. 12, 1932 |
| 2,462,150 | Wilkinson | Feb. 22, 1949 |
| 2,617,337 | Snyder | Nov. 11, 1952 |
| 2,733,366 | Grimm et al. | Jan. 31, 1956 |
| 2,899,581 | Clapp | Aug. 11, 1959 |

FOREIGN PATENTS

| 713,908 | Great Britain | Aug. 18, 1954 |

OTHER REFERENCES

Clerc: Photography Theory and Practice, p. 99, Greenwood & Co. Ltd., 1937, London.